(12) United States Patent
Polak et al.

(10) Patent No.: US 11,645,211 B2
(45) Date of Patent: May 9, 2023

(54) AUGMENTING STORAGE FUNCTIONALITY USING EMULATION OF STORAGE CHARACTERISTICS

(71) Applicant: Amazon Technologies, Inc., Seattle, WA (US)

(72) Inventors: Gracjan Maciej Polak, Vancouver (CA); Kanika Kalra, Vancouver (CA); Vinayak Sundar Raghuvamshi, North Vancouver (CA); Syed Sajid Nizami, Vancouver (CA); Per Weinberger, North Vancouver (CA); Amit Chhabra, Vancouver (CA); Chaiwat Shuetrakoonpaiboon, Vancouver (CA); Chen Zhou, Burnaby (CA); Muhammad Usman, Vancouver (CA); Jacob Shannan Carr, Seattle, WA (US); Nimit Kumar Garg, Vancouver (CA); Jazarine Jamal, Vancouver (CA); Reza Shahidi-Nejad, Vancouver (CA)

(73) Assignee: Amazon Technologies, Inc., Seattle, WA (US)

(*) Notice: Subject to any disclaimer, the term of this patent is extended or adjusted under 35 U.S.C. 154(b) by 72 days.

(21) Appl. No.: 17/400,064

(22) Filed: Aug. 11, 2021

(65) Prior Publication Data

US 2021/0374072 A1 Dec. 2, 2021

Related U.S. Application Data

(63) Continuation of application No. 16/584,864, filed on Sep. 26, 2019, now Pat. No. 11,093,409.

(51) Int. Cl.
*G06F 12/1081* (2016.01)
*G06F 12/126* (2016.01)

(52) U.S. Cl.
CPC ........ *G06F 12/1081* (2013.01); *G06F 12/126* (2013.01); *G06F 2212/151* (2013.01)

(58) Field of Classification Search
None
See application file for complete search history.

(56) References Cited

U.S. PATENT DOCUMENTS 6,640,278 B1 * 10/2003 Nolan ................... G06F 3/0605
707/999.102
8,112,266 B2 * 2/2012 Rajan ....................... G11C 7/10
703/24

(Continued)

*Primary Examiner* — Michael Alsip
(74) *Attorney, Agent, or Firm* — Robert C. Kowert; Kowert, Hood, Munyon, Rankin & Goetzel, P.C.

(57) ABSTRACT

Methods, systems, and computer-readable media for augmenting storage functionality using emulation of storage characteristics are disclosed. An access request for a data set is received. The access request is formatted according to a first protocol associated with a first data store, and the first data store is associated with first storage characteristics. The access request is translated into a translated access request. The translated access request is formatted according to a second protocol associated with a second data store, and the second data store is associated with second storage characteristics differing at least in part from the first storage characteristics. The translated access request is sent to the second data store. The translated access request is performed by the second data store on the data set using emulation of one or more of the first storage characteristics not included in the second storage characteristics.

20 Claims, 9 Drawing Sheets

(56) References Cited

U.S. PATENT DOCUMENTS

| | | |
|---|---|---|
| 8,250,102 B2 | 8/2012 | Madhavarapu et al. |
| 11,093,409 B1 | 8/2021 | Polak et al. |
| 2005/0049848 A1* | 3/2005 | Dai .................... G06F 3/0673 |
| | | 703/24 |
| 2014/0192583 A1* | 7/2014 | Rajan .................... G11C 7/10 |
| | | 365/63 |
| 2016/0077966 A1 | 3/2016 | Stabrawa et al. |
| 2016/0259597 A1* | 9/2016 | Worley ................ G06F 3/0661 |
| 2016/0274800 A1 | 9/2016 | Earhart |
| 2017/0147227 A1 | 5/2017 | Stabrawa et al. |

* cited by examiner

AUGMENTING STORAGE FUNCTIONALITY USING EMULATION OF STORAGE CHARACTERISTICS

BACKGROUND

This application is a continuation of U.S. patent application Ser. No. 16/584,864, filed Sep. 26, 2019, which is hereby incorporated by reference herein in its entirety.

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. However, as the scale and scope of distributed systems have increased, the tasks of provisioning, administering, and managing the resources have become increasingly complicated.

Using such distributed systems, storage solutions may be implemented in cloud computing environments that offer multi-tenancy for storage resources. The features or functionality offered by individual storage solutions may vary, e.g., in terms of latency, throughput, security, consistency, and other characteristics. Typically, a user chooses one type of storage solution to meet the needs of a particular data set. In making such a choice, the user may have access only to the limited set of features provided by the selected storage solution for that particular data set. To leverage the features of another type of storage solution, the user may be required to migrate the data set to that storage solution. In order to access the migrated data, the client application must often be recoded.

Figure 1A:
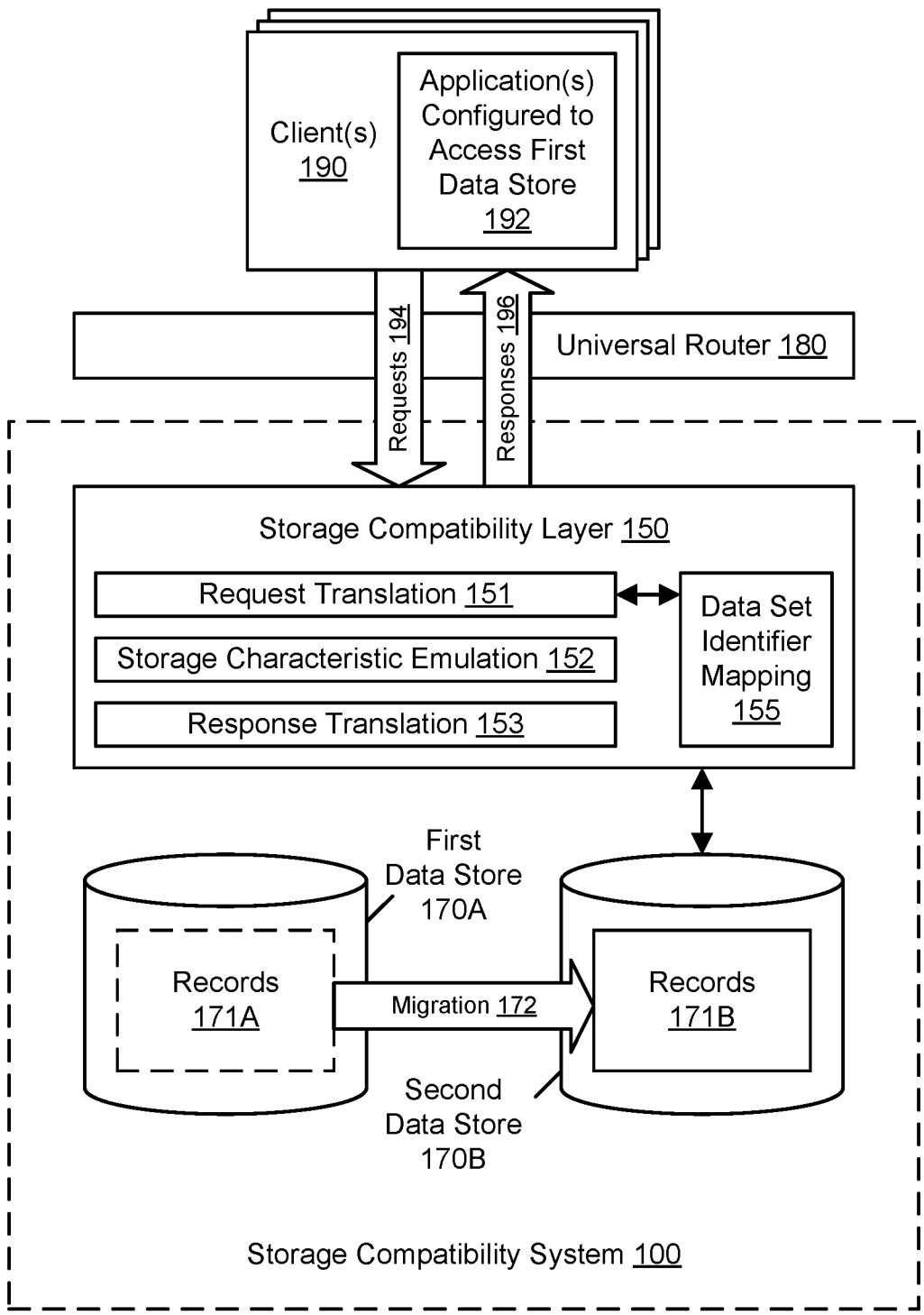
FIG. 1A and FIG. 1B illustrate an example system environment for augmenting storage functionality using emulation of storage characteristics, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for augmenting storage functionality using emulation of storage characteristics are described. Different storage solutions may offer different features, functionality, or other characteristics. The differing storage characteristics may be associated with differing degrees or guarantees of latency, throughput, security, consistency, reliability, and so on. For example, a first data store may natively offer a tombstone feature for deleted records while a second data store may not, and the second data store may offer strong consistency using a single master while the first data store may not. Using the techniques described herein, a compatibility layer may permit clients to access one data store using a protocol associated with another data store. The compatibility layer may perform request translation from a format or protocol associated with a first data store to a format or protocol associated with a second data store. Records may be stored in the second data store using native storage characteristics of that data store, e.g., strong consistency. Additionally, records may be stored in the second data store using emulation of storage characteristics of the first data store, e.g., by storing additional record-level attributes for emulation of tombstoning, expires headers, time headers, optimistic locking, and so on. Using these techniques, the functionality of storage solutions may be augmented using emulation of storage characteristics of one data store combined with the native storage characteristics of another data store. The compatibility layer may facilitate migration from a first data store to a second data store without the need to change the program code of client applications or client libraries that use the protocol of the first data store.

As one skilled in the art will appreciate in light of this disclosure, embodiments may be capable of achieving certain technical advantages, including some or all of the following: (1) reducing the complexity and time associated with software development by not requiring changes to client applications or client libraries after migration of a data set from one data store to another; (2) minimizing application downtime by not requiring changes to client applications or client libraries after migration of a data set from one data store to another; (3) improving the availability of a data store by allowing access by clients of another data store using a compatibility layer; (4) improving the consistency of data by allowing data store clients of a first data store to access data in a second data store that offers strong consistency; (5) improving the durability of data by allowing data store clients of a first data store to access data in a second data store; and so on.

Figure 1B:
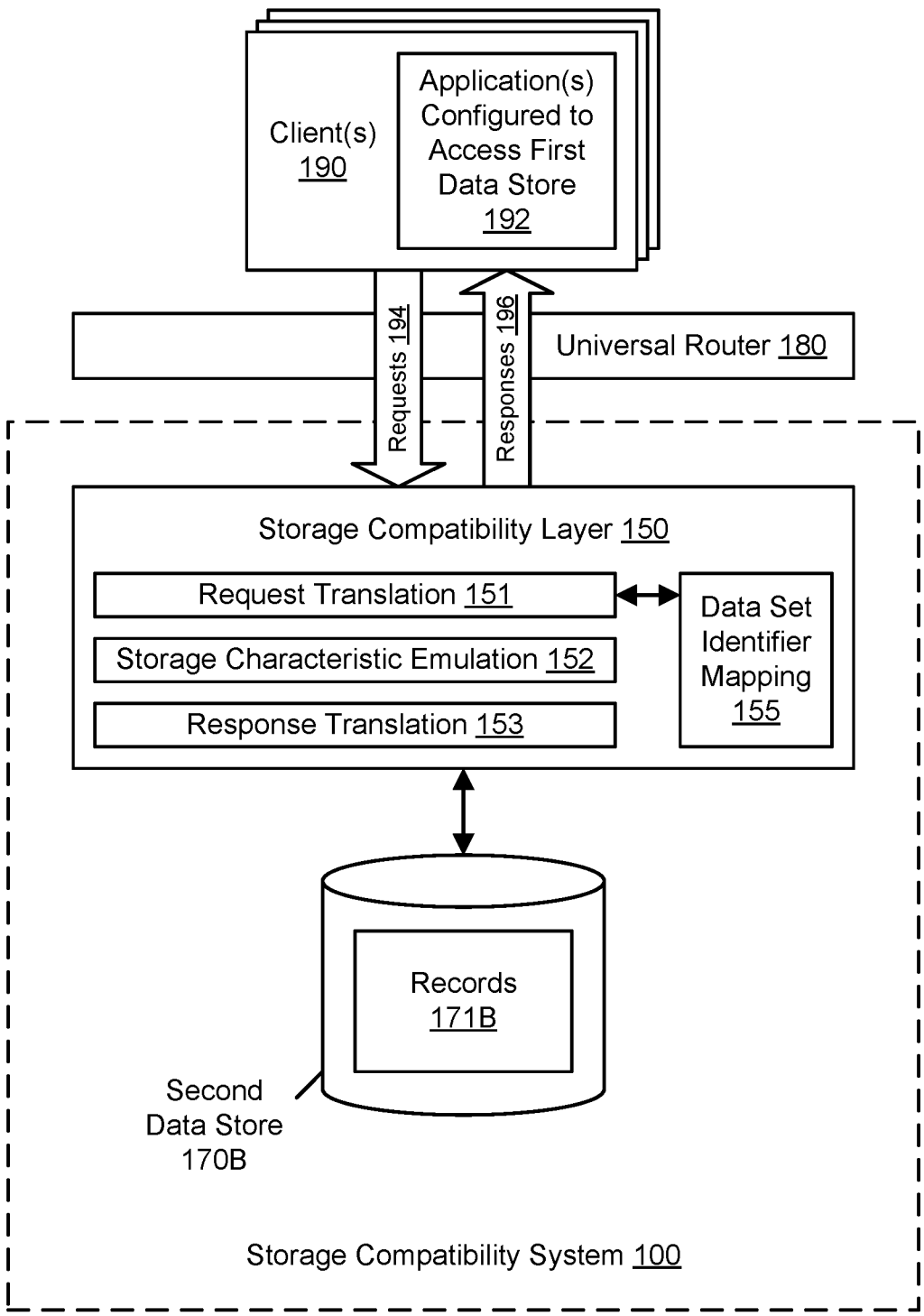

FIG. 1A and FIG. 1B illustrate an example system environment for augmenting storage functionality using emulation of storage characteristics, according to some embodiments. A storage compatibility system 100 may enable one or more clients 190 to access a data set in a manner that emulates storage characteristics of one data store while providing the native storage characteristics of another data store. The client(s) 190 may include client application(s) 192 or client libraries that are configured to access a data set in a first data store 170A. The data set may include a plurality of records 171A. Access to the data store 170A may include sending requests to read records, write records, delete records, and so on. The first data store 170A may be associated with a particular protocol that dictates how such requests are formatted. For example, the protocol of the first data store 170A may specify a set of verbs that represent particular operations that the first data store 170A can take with respect to the data set. In access requests 194 generated by the application(s) 192, an operation name may be accompanied by one or more attributes of the requested operation, e.g., attributes that identify records to be read, identify records to be written to, specify the content of requested writes, identify records to be deleted or expired, and/or specify other parameter values that affect the outcome of the requested operation. The client application(s) 192 or client libraries may include program code for generating these requests 194 and receiving and interpreting responses 196 to the requests according to the protocol associated with the first data store 170A.

Under some circumstances, the same client(s) 190 may seek to access the data set in a second data store 170B. As shown in FIG. 1A, for example, a migration process 172 may be performed to move the data set from the first data store 170A to the second data store 170B. As shown in FIG. 1B, the client(s) 190 may access the second data store 170B without having to perform a migration from the first data store 170A. For example, a customer may seek to use semantics of the first data store 170A with operations offered by the second data store 170B without having to change the code of the application(s) 192. The migration 172 may create records 171B in the second data store 170B that represent the migrated data set. The second data store 170B may be associated with a different protocol that dictates how access requests are formatted. For example, the protocol for accessing the second data store 170B may include different operation names and/or different attribute formatting than the protocol for accessing the first data store 170A. However, as discussed above, the client application(s) 192 or client libraries may be coded to generate requests and receive responses according to the protocol of the first data store 170A and not according to the protocol of the second data store 170B. Using a component for request translation 151 in a storage compatibility layer 150, requests 194 may be received from the client(s) 190 according to the protocol of the first data store 170A, translated into a different format according to the protocol of the second data store 170B, and sent to the second data store according to the protocol of the second data store 170B. Request translation 151 may include mapping an operation name in the header of the original request to a semantically equivalent operation name usable with the second data store. For example, the request translation 151 may include mapping the operation name GETKEY to GetItem, the operation name GETKEYPREFIX to Query, the operation name PUBLISH (PUT) to PutItem, the operation name PUBLISH (DELETE) to DeleteItem, the operation name QUERY to Scan, and so on. Request translation 151 may include mapping one or more attribute names and/or values in the header of the original request to semantically equivalent attribute name(s) and/or value(s) usable with the second data store 170B. Request translation 151 may be performed using a mapping 155 of data set identifiers (e.g., scope names) for the first data store 170A to data set identifiers (e.g., account identifiers and table names) for the second data store 170B. Request translation 151 may include mapping of formatting-related features such as different pagination tokens. Request translation 151 may represent a stateless operation.

Similarly, using a component for response translation 153, responses from the second data store 170B (e.g., results of read requests, error codes, acknowledgements, and so on) may be received by the compatibility layer 150 according to the protocol of the second data store 170B, translated into a different format according to the protocol of the first data store 170A, and sent to the appropriate client(s) 190 according to the protocol of the first data store 170A. Response translation 153 may include mapping an error code or results format in the original response to a semantically equivalent error code or results format associated with the first data store. Response translation 153 may represent a stateless operation. For translating error codes, the response translation 153 may use an error code table to map from the protocol of the second data store 170B to the protocol of the first data store 170A. Thus the compatibility layer 150 may allow client(s) 190 to continue to run application(s) 192 or client libraries that are programmed for accessing the first data store 170A without necessarily having to modify the program code of the application(s) or client libraries to access the second data store 170B. In one embodiment, the use of the second data store 170B to store the records 171B instead of the first data store 170A may be transparent to client(s) 190.

Requests 194 from application(s) 192 operated by client(s) 190 may be directed to a universal router 180 before, during, and after a migration. Similarly, responses 196 to the requests may be routed to the application(s) 192 by the universal router 180. In one embodiment, the application(s) 192 need not be modified in conjunction with the migration 172; instead the universal router 180 may be reconfigured to route requests 194 to the compatibility layer 150 after the migration. The storage compatibility system 100 may be configured to work with a variety of different data stores. In one embodiment, the universal router 180 may translate, reformat, or otherwise modify requests from the application(s) as appropriate for the target data stores, e.g., via data-store-specific adapters.

A plurality of data stores such as the first data store 170A and second data store 170B may each offer storage of records, potentially using different underlying storage technologies, architectures, and/or resource types to store data.

The data stores 170A-170B may be accessible via different application programming interfaces (APIs). For example, data objects may be added to data store 170A via a first set of one or more APIs, and data objects may be added to data store 170B via a second set of one or more APIs that differ in some way from the first set. In one embodiment, the data stores 170A-170B may include NoSQL data stores. In one embodiment, the data stores 170A-170B may include non-relational key-value data stores that store key-value pairs. In one embodiment, the data stores 170A-170B may include relational data stores. In some embodiments, the data stores 170A-170B may use the same or different types of persistent storage resources such as hard disk drives, solid-state drives, and so on. The data stores 170A-170B may offer storage in a manner independent of each other. The data stores 170A-170B may be hosted in the same or different geographical regions or network zones. In some embodiments, the data stores 170A-170B may be maintained by different business entities or service providers. In some embodiments, the data stores 170A-170B may be maintained by different divisions within a single business entity or enterprise.

In one embodiment, one or more of the data stores 170A-170B may represent a distributed hash table (DHT). In one embodiment, the data stores 170A-170B may include non-relational key-value data stores (e.g., NoSQL stores) that store key-value pairs. In one embodiment, the data stores 170A-170B may include relational data stores. In order to be usable with the system 100, the data stores 170A-170B may satisfy a minimal set of requirements, such as offering APIs for getting a value by key, putting a value by key, conditionally putting a value by key, and deleting a key-value pair. The data stores 170A-170B may differ in their performance characteristics. For example, one data store may represent a hot storage tier with lower latency, while another data store may represent a cold storage tier with higher latency but lower cost and a longer storage window. In one embodiment, one or more of the data stores 170A-170B may represent a hosted data storage solution offering security, speed, availability, reliability, and scalability. In one embodiment, one or more of the data stores 170A-170B may be offered as a storage service available to many clients (internal to an enterprise and/or external to the enterprise). The data stores 170A-170B may scale to handle a very large amount of data, and a fleet of hosts that implement the storage compatibility system 100 may also scale to handle such data.

Different storage solutions such as data stores 170A-170B may offer different features, functionality, or other characteristics. The differing storage characteristics may be associated with differing degrees or guarantees of latency, throughput, security, consistency, reliability, and so on. For example, the first data store 170A may natively offer a tombstone feature for deleted records (e.g., where metadata is maintained for a time to indicate that a record was deleted), while the second data store 170B may not. As another example, the second data store 170B may offer strong consistency using a single master, while the first data store 170A may instead offer a different consistency model. As discussed above, the compatibility layer 150 may permit client(s) 190 to access one data store 170B using a protocol associated with another data store 170A by performing request translation 151 and response translation 153. Additionally, the compatibility layer 150 may include a component for storage characteristic emulation 152. Using the storage characteristic emulation 152, records may be stored in the second data store 170B using emulation of storage characteristics of the first data store 170A. In some embodiments, for example, the storage characteristic emulation 152 may perform emulation of tombstoning, expires headers, time headers, optimistic locking, and/or other features. Storage characteristics of the first data store 170A may be emulated by storing additional record-level attributes in the second data store 170B and using the compatibility layer 150 to interpret those attributes. The record-level attributes may represent custom attributes that are permitted by the second data store 170B. The storage characteristic emulation 152 may map a key entity part of a request to a primary key and a key discriminator part of a request to a sort key.

In addition to the features achieved via emulation 152, records may be stored in the second data store 170B using native storage characteristics of that data store. For example, records 171B may be stored with strong consistency across multiple replicas using a single master to serialize all writes, such that accesses to the records are seen by all parallel processes (e.g., nodes, processors, and so on.) in the same order (sequentially). The first data store 170A may not provide a guarantee of strong consistency. For example, the first data store 170A may instead offer a quorum consistency model among replicas. For a strongly consistent read, the second data store 170B may return a response with the most up-to-date data, where the response reflects the updates from all prior write operations that were successful. In one embodiment, the data store 170B may offer different consistency models such as strong consistency and eventual consistency, and the consistency model may be specified with an access request generated specifically for the protocol of the data store or according to a default consistency model if the access request is translated into the protocol by the compatibility layer 150. As another example, the second data store 170B may offer different throughput levels for the same table for different users, but the first data store 170A may not natively offer such a feature. Such access throttling may be enabled for all or part of the records 171B in the data store 170B, even if those records are accessed using the protocol of the first data store 170A. In comparison to the first data store 170A, the second data store 170B may offer native characteristics including stronger consistency, a different isolation model, a different provisioning model, a snapshot-style backup and restore, a different billing scheme, and/or other features. For example, the first data store 170A may require long lead times (e.g., weeks or months) to satisfy some provisioning requests, while the second data store 170B may satisfy provisioning requests in minutes. Using the compatibility layer 150, the functionality of storage solutions may be augmented using emulation of storage characteristics of one data store (e.g., data store 170A) combined with the native storage characteristics of another data store (e.g., data store 170B).

The storage compatibility system 100 may be implemented using one or more services. Each of the services may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. This modularity may enable services to be reused in order to build various applications through a process referred to as orchestration. A service may include one or more components that may also participate in the distributed system, e.g., by passing messages to other services or to other components within the same service. A service may offer one or more application programming interfaces (APIs) or other programmatic interfaces through which another service may request the functionality of the service. Components of the storage compatibility system 100, such as the storage compatibility layer 150, may be configured to process requests from various internal or external systems, such as client computer systems 190 or computer systems consuming networked-based services (e.g., web services). Services may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP).

Figure 8:
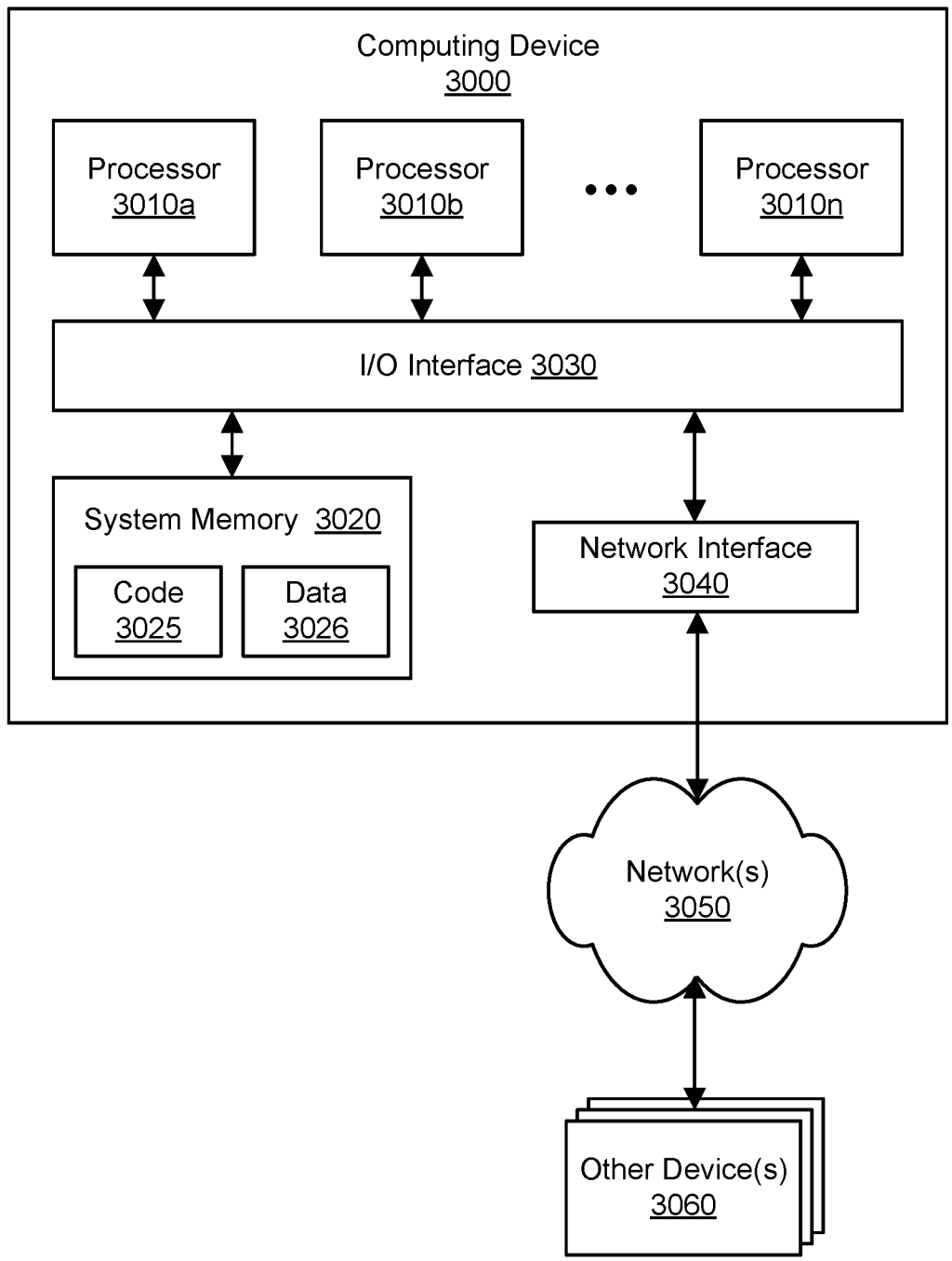
FIG. 8 illustrates an example of a computing device that may be used in some embodiments.

The storage compatibility system 100 may include one or more computing devices, any of which may be implemented by the example computing device 3000 illustrated in FIG. 8. For example, the compatibility layer 150 may be implemented using one or more computing devices, and that number of devices may scale up or down according to the volume of requests 194 and/or other performance metrics. In various embodiments, the functionality of the different services, components, and/or modules of the storage compatibility system 100 may be provided by the same computing device or by different computing devices. If any of the various components are implemented using different computing devices, then the respective computing devices may be communicatively coupled, e.g., via a network. Each of the components of the storage compatibility system 100 may represent any combination of software and hardware usable to perform their respective functions, as discussed as follows. Functions implemented by the storage compatibility system 100 may be performed automatically, e.g., without a need for user initiation or user intervention after an initial configuration stage, and programmatically, e.g., by execution of program instructions on at least one computing device. In one embodiment, aspects of the storage compatibility system 100 may be performed repeatedly over time. The storage compatibility system 100 may include additional components not shown, fewer components than shown, or different combinations, configurations, or quantities of the components shown.

The migration process 172 may be implemented using one or more instances that are distributed throughout one or more networks, and each instance may offer access to the functionality of a live request router to various clients 190 (via the universal router 180). An individual instance of a migration router may be implemented using one host or a plurality of hosts, any of which may be implemented by the example computing device 3000 illustrated in FIG. 8. The number of hosts may scale up or down according to the needs of a particular migration. Similarly, any of the data stores 170A-170B may represent one or more service instances and may be implemented using one host or a plurality of hosts, any of which may be implemented by the example computing device 3000 illustrated in FIG. 8. The hosts may be located in any suitable number of data centers or geographical locations. In one embodiment, multiple services and/or instances of the same service may be implemented using the same host. In one embodiment, the compatibility layer 150 may implement the migration 172.

It is contemplated that any suitable number and configuration of clients 190 may interact with the services of the storage compatibility system 100. Components shown in FIG. 1A and FIG. 1B may convey network-based service requests to one another via one or more networks. In various embodiments, the network(s) may encompass any suitable combination of networking hardware and protocols necessary to establish network-based communications between two services. For example, the network(s) may generally encompass the various telecommunications networks and service providers that collectively implement the Internet. The network(s) may also include private networks such as local area networks (LANs) or wide area networks (WANs) as well as public or private wireless networks. The network(s) may include the hardware (e.g., modems, routers, switches, load balancers, proxy servers, etc.) and software (e.g., protocol stacks, accounting software, firewall/security software, etc.) necessary to establish a networking link between a first component and the Internet as well as between the Internet and a second component. In some embodiments, components may communicate with one another using a private network rather than the public Internet.

In one embodiment, aspects of the storage compatibility system 100 may be implemented using computing resources of a provider network. A provider network may represent a network set up by an entity such as a company or a public-sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

Figure 2:
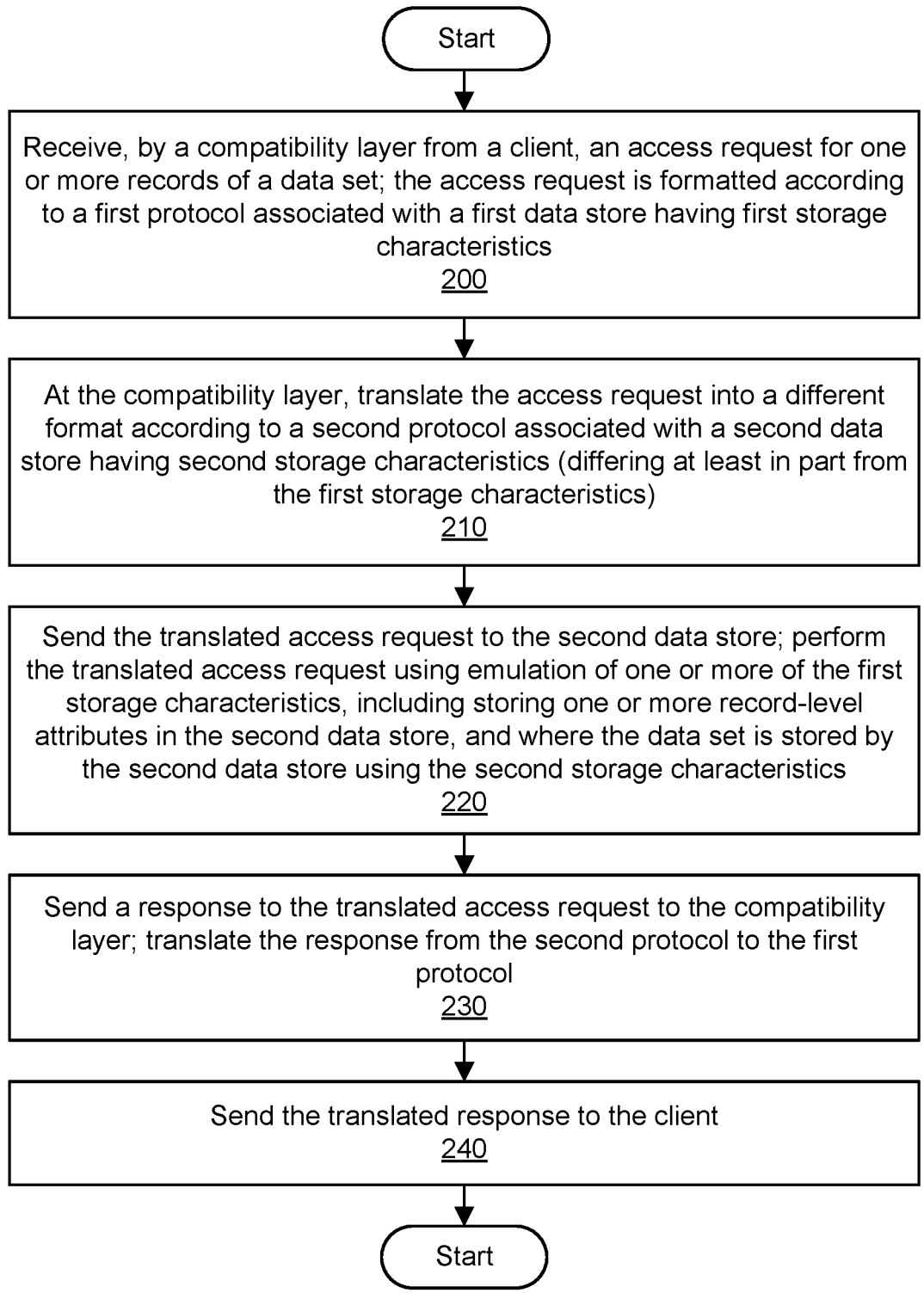
FIG. 2 is a flowchart illustrating a method for augmenting storage functionality using emulation of storage characteristics, according to some embodiments.

FIG. 2 is a flowchart illustrating a method for augmenting storage functionality using emulation of storage characteristics, according to some embodiments. As shown in 200, an access request may be received from a client by a compatibility layer of a storage system. The access request may be associated with one or more records of a data set. The access request may represent a request to read one or more records, write one or more records, delete or expire one or more records, and so on. The access request may be formatted according to a protocol associated with a first data store. For example, the protocol of the first data store may specify a set of verbs that represent particular operations that the first data store can take with respect to the data set. In the access request, an operation name may be accompanied by one or more attributes of the requested operation, e.g., attributes that identify records to be read, identify records to be written to, specify the content of requested writes, identify records to be deleted or expired, and/or specify other parameter values that affect the outcome of the requested operation.

The client may represent a client application or client library that includes program code for generating the access request (and receiving and interpreting a response to the request) according to the protocol associated with the first data store. In one embodiment, the access request may be routed via a universal router.

As shown in 210, the access request may be translated into a different format by the compatibility layer, thereby producing a translated access request. The different format may represent a format expected by a second data store that stores the one or more records identified in the access request. The second data store may be associated with a different protocol that dictates how access requests are formatted. For example, the protocol for accessing the second data store may include different operation names and/or different attribute formatting than the protocol for accessing the first data store. Request translation may include mapping an operation name in the original request to a semantically equivalent operation name usable with the second data store. Request translation may include mapping an attribute name and/or value in the original request to a semantically equivalent attribute name and/or value usable with the second data store.

As shown in 220, the translated access request may be sent by the compatibility layer to the second data store. The operation identified in the translated access request may be attempted by the second data store. The two data stores may offer different features, functionality, or other characteristics. The differing storage characteristics may be associated with differing degrees or guarantees of latency, throughput, security, consistency, reliability, and so on. For example, the first data store may natively offer a tombstone feature for deleted records (e.g., where metadata is maintained for a time to indicate that a record was deleted), while the second data store may not. The compatibility layer may perform emulation of one or more storage characteristics of the first data store (that are not necessarily offered by the second data store) in implementing the access request. In some embodiments, for example, the storage characteristic emulation may perform emulation of tombstoning, expires headers, time headers, optimistic locking, and/or other features. Storage characteristics of the first data store may be emulated by storing additional record-level attributes in the second data store and using the compatibility layer to interpret those attributes. Additionally, the second data store may store the record(s) identified in the request or otherwise perform the request using one or more native storage characteristics of the second data store (that are not necessarily offered by the first data store). For example, the second data store may offer strong consistency for reads using a single master, while the first data store may instead offer a different consistency model.

As shown in 230, a response to the translated access request may be sent from the second data store to the compatibility layer. The response may represent the results of a read request, an error code, an acknowledgement of a successful write operation, and so on. The compatibility layer may translate the response from the protocol associated with the second data store to the protocol associated with the second data store. Response translation may include mapping an error code or results format in the original response to a semantically equivalent error code or results format associated with the first data store.

As shown in 240, the translated response may be sent by the compatibility layer to the client that provided the original request. In one embodiment, the translated response may be routed via a universal router. The client may receive and interpret the response according to the protocol associated with the first data store. Thus the compatibility layer may allow the client to continue to run an application or client library that has been programmed for accessing the first data store without necessarily having to modify the program code of the application or client library to access the second data store.

Figure 3:
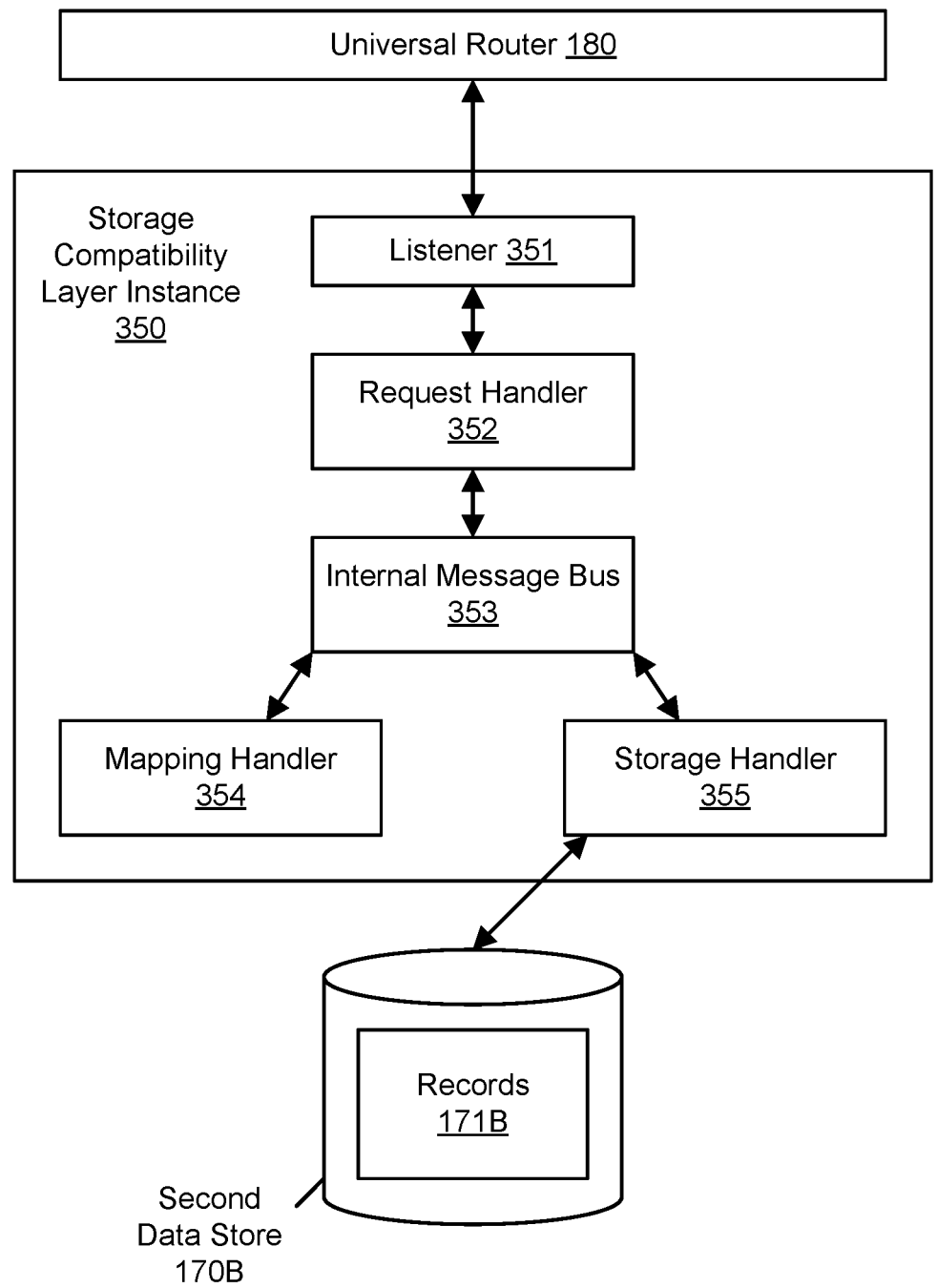
FIG. 3 illustrates further aspects of the example system environment for augmenting storage functionality using emulation of storage characteristics, including components of an instance that implements the compatibility layer, according to some embodiments.

FIG. 3 illustrates further aspects of the example system environment for augmenting storage functionality using emulation of storage characteristics, including components of an instance that implements the compatibility layer, according to some embodiments. The storage compatibility layer 150 may include a plurality of instances or hosts, such as instance 350, each of which may implement the mapping and emulation functionality discussed herein. Load-balancing techniques may be used to select a particular instance 350 for a particular incoming request from the universal router 180. The storage compatibility layer instance 350 may use an event-driven, non-blocking design that decouples different components (such as handlers) using a message bus 353. The sender of a message may put a message on the message bus 353. A registered listener may consume the message and send back the reply to the sender. The message bus 353 may support publish/subscribe, point to point, and request-response messaging. The message bus 353 may be used to send messages asynchronously between the handlers in a decoupled manner.

As shown in FIG. 3, a listener 351 may provide the capability to listen to and handle requests expressed in the protocol or API associated with the first data store 170A. A request handler 352 may be instantiated within the instance 350 when a request is received. A mapping handler 354 may implement API mapping and data mapping as discussed with respect to the request translation 151 and response translation 153. A storage handler 355 may take a translated request produced by the mapping handler 354 and send it to the second data store 170B. A reply from the second data store 170B is sent back to the mapping handler 354 for mapping it back to the format associated with the first data store 170A.

Figure 4:
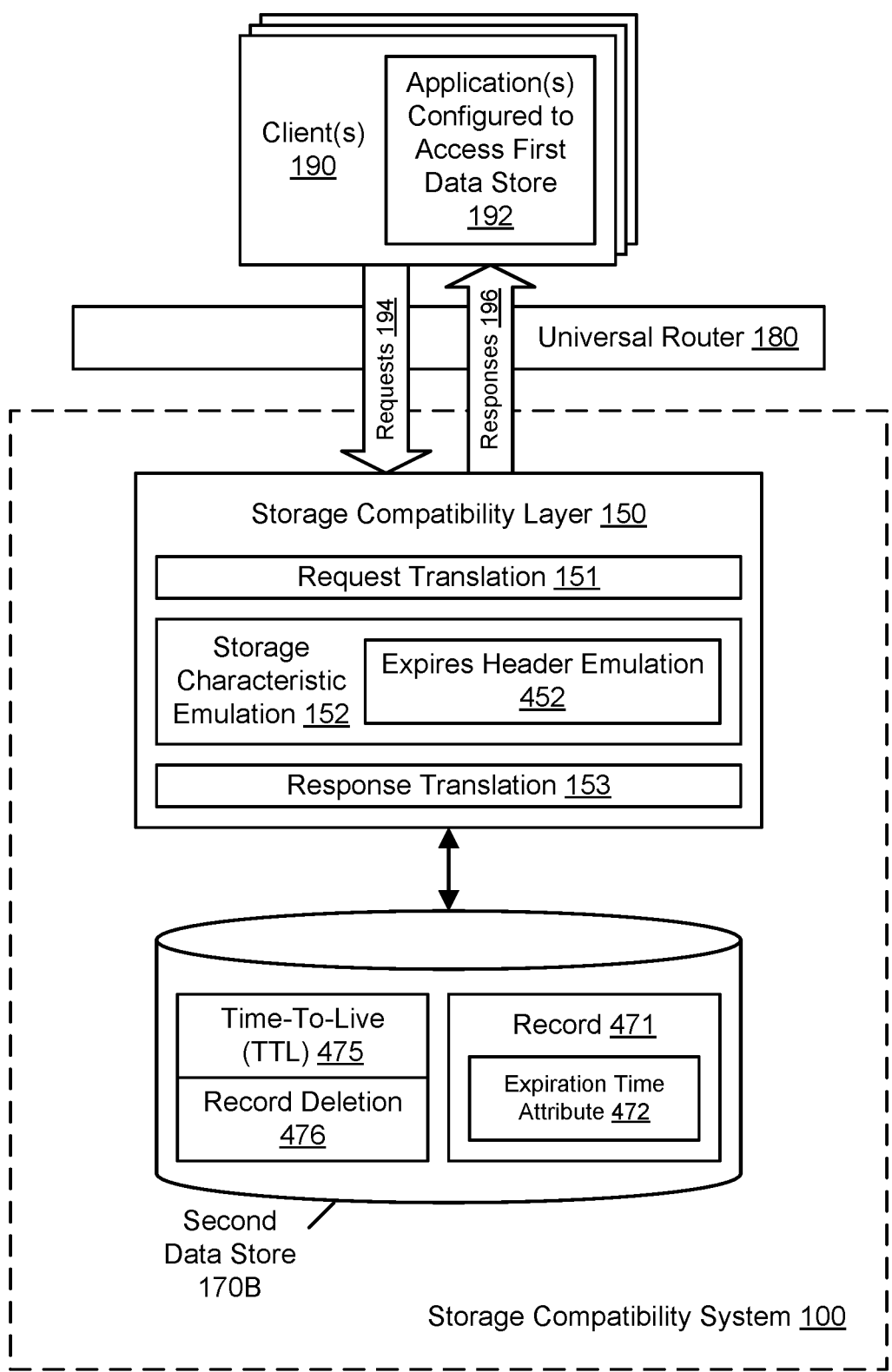
FIG. 4 illustrates further aspects of the example system environment for augmenting storage functionality using emulation of storage characteristics, including emulation of a record expiration characteristic, according to some embodiments.

FIG. 4 illustrates further aspects of the example system environment for augmenting storage functionality using emulation of storage characteristics, including emulation of a record expiration characteristic, according to some embodiments. As discussed above, the data stores 170A-170B may offer different features, functionality, or other storage characteristics that are associated with differing degrees or guarantees of latency, throughput, security, consistency, reliability, and so on. For example, the first data store 170A may natively offer a record expiration feature, while the second data store 170B may not. The component for storage characteristic emulation 152 may include a component for expires header emulation 452 that implements emulation of the record expiration characteristic of the first data store 170A. A request to store a record 471 may be received using semantics of the first data store 170A and including an "expires" header than indicates a time at which the record should be deemed expired. The expires header for the request may use a string as a date representation. Using the expires header emulation 452, the record 471 may be stored in the second data store 170B with additional data that can be used for emulation of the record expiration feature. As shown in FIG. 4, the record may be stored with a custom expiration time attribute 472 that indicates a particular time at which the record 471 should be deemed to be expired. The time attribute 472 may represent a date using a numerical value, e.g., that represents Unix seconds. The expiration time may be indicated in the expires header (formatted for the first data store) of the original request and may be mapped from the string representation to the numerical representation.

A time-to-live (TTL) feature 475 of the second data store 170B may be used by the expires header emulation 452 to automatically perform expiration of the record 471 when the expiration time indicated in the attribute 472 is reached. The TTL feature 475 may define when items in a table expire so that they can be automatically deleted. TTL 475 may be enabled on a table-by-table basis. With TTL enabled, a user may set a timestamp for deletion on a per-item basis. The user or the compatibility layer 150 may configure the second data store 170B such that the TTL feature 475 looks to the custom expiration time attribute 472. Using the TTL feature, upon the expiration time 472 being reached, the record 471 may be marked for deletion by a deletion component 476 of the second data store 170B but may not necessarily be deleted immediately. Expired records may not be returned to clients by default according to the protocol of the first data store 170A, but a read request may include a "filter:f" header to indicate that expired records should be returned.

Figure 5:
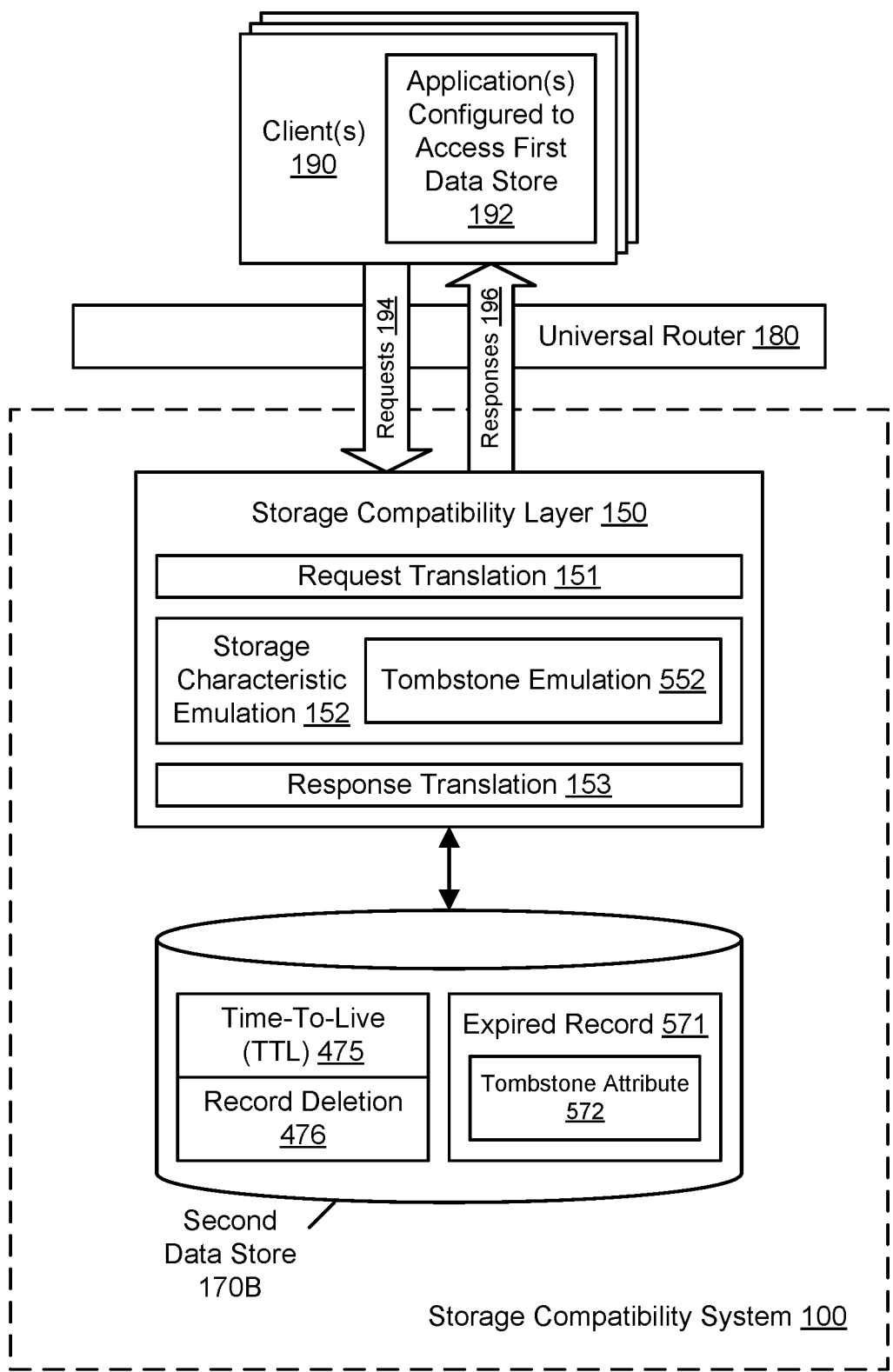
FIG. 5 illustrates further aspects of the example system environment for augmenting storage functionality using emulation of storage characteristics, including emulation of a tombstone characteristic, according to some embodiments.

FIG. 5 illustrates further aspects of the example system environment for augmenting storage functionality using emulation of storage characteristics, including emulation of a tombstone characteristic, according to some embodiments. As discussed above, the data stores 170A-170B may offer different features, functionality, or other storage characteristics that are associated with differing degrees or guarantees of latency, throughput, security, consistency, reliability, and so on. For example, the first data store 170A may natively offer a tombstone feature for deleted records where metadata is maintained for a predetermined period of time to indicate that a record was deleted, while the second data store 170B may not. The component for storage characteristic emulation 152 may include a component for tombstone emulation 552 that implements emulation of the tombstone characteristic of the first data store 170A. Using the tombstone emulation 552, an expired record 571 may be stored in the second data store 170B with additional data that can be used for emulation of the tombstone feature. As shown in FIG. 5, the record may be stored with a custom tombstone attribute 572 that indicates that the record has expired. The time-to-live (TTL) feature 475 of the second data store 170B and/or the deletion component 476 may be used by the tombstone emulation 552 to perform deletion of the record 571 at an appropriate time, e.g., after a predetermined period of time has passed since the tombstone attribute 572 was added or since a time indicated by the tombstone attribute 572. Tombstoned records may not be returned to clients by default according to the protocol of the first data store 170A, but a read request may include a "filter:f" header to indicate that tombstone records should be returned.

Figure 6:
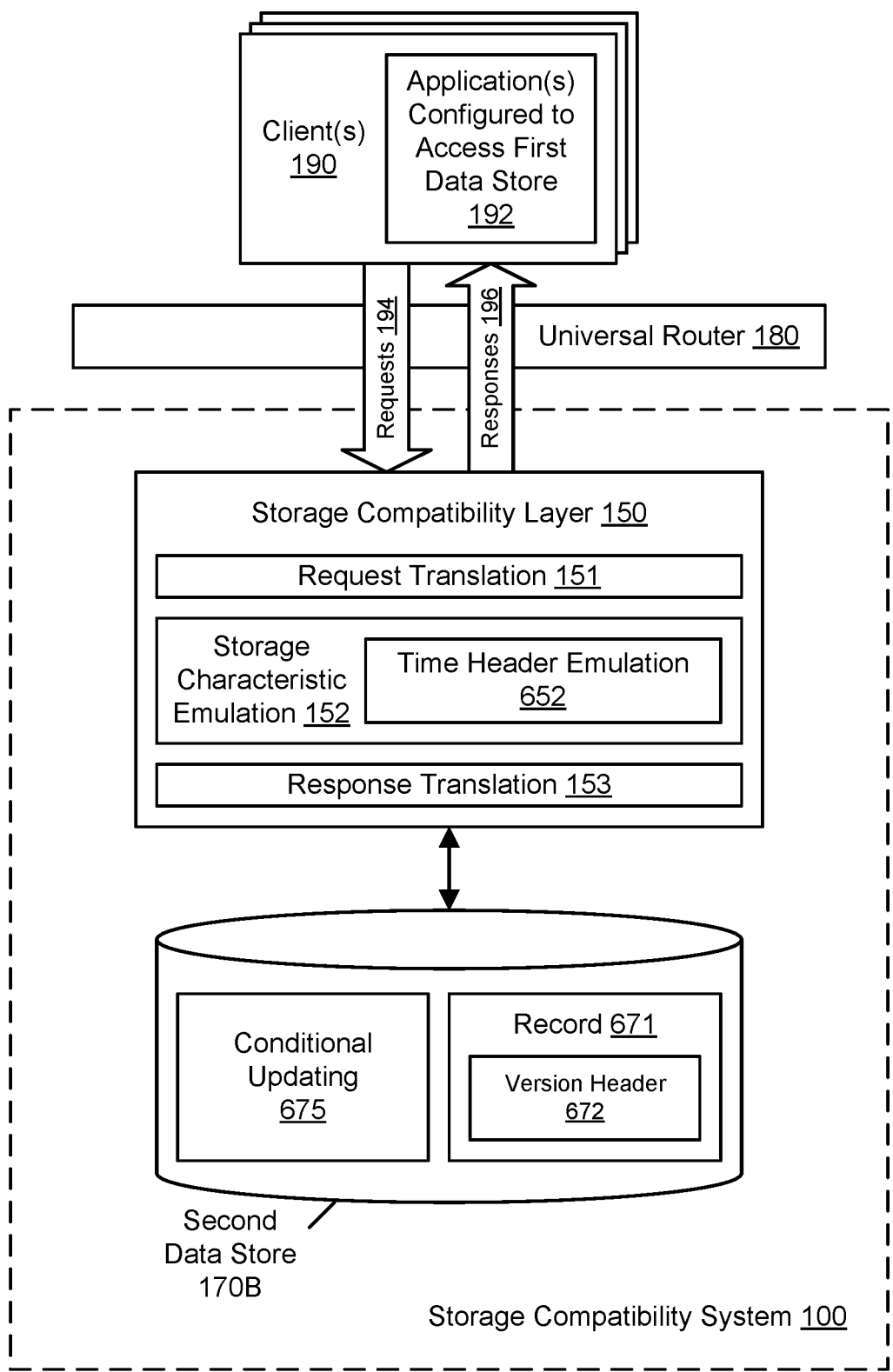
FIG. 6 illustrates further aspects of the example system environment for augmenting storage functionality using emulation of storage characteristics, including emulation of a time header characteristic, according to some embodiments.

FIG. 6 illustrates further aspects of the example system environment for augmenting storage functionality using emulation of storage characteristics, including emulation of a time header characteristic, according to some embodiments. As discussed above, the data stores 170A-170B may offer different features, functionality, or other storage characteristics that are associated with differing degrees or guarantees of latency, throughput, security, consistency, reliability, and so on. For example, the first data store 170A may natively offer a time header for individual records that indicates the relative newness of records, while the second data store 170B may not. The component for storage characteristic emulation 152 may include a component for time header emulation 652 that implements emulation of the time header characteristic of the first data store 170A. Using the time header emulation 652, a record 671 may be stored in the second data store 170B with additional data that can be used for emulation of the time header feature. As shown in FIG. 6, the record may be stored with a version header 672 that indicates a monotonically increasing value. In one embodiment, the value may be indicated by the client. A conditional updating component 675 of the second data store 170B may be used by the time header emulation 652 to perform or deny a request to update or overwrite the record 671 based (at least in part) on the version header. For example, if the client requests to overwrite the record 671 with another record having an older or smaller version number (as indicated in the time header of the incoming request), then the write request may be rejected. However, if the client requests to overwrite the record 671 with another record having a newer or higher version number (as indicated in the time header of the incoming request), then the write request may be performed. In some embodiments, the conditional update feature 675 may use tombstones to determine whether to perform requested updates. For example, if a record 571 has the tombstone attribute 572 indicating a previous existence of the record, then the conditional updating component 675 may use such information to accept or reject a request to update.

Figure 7:
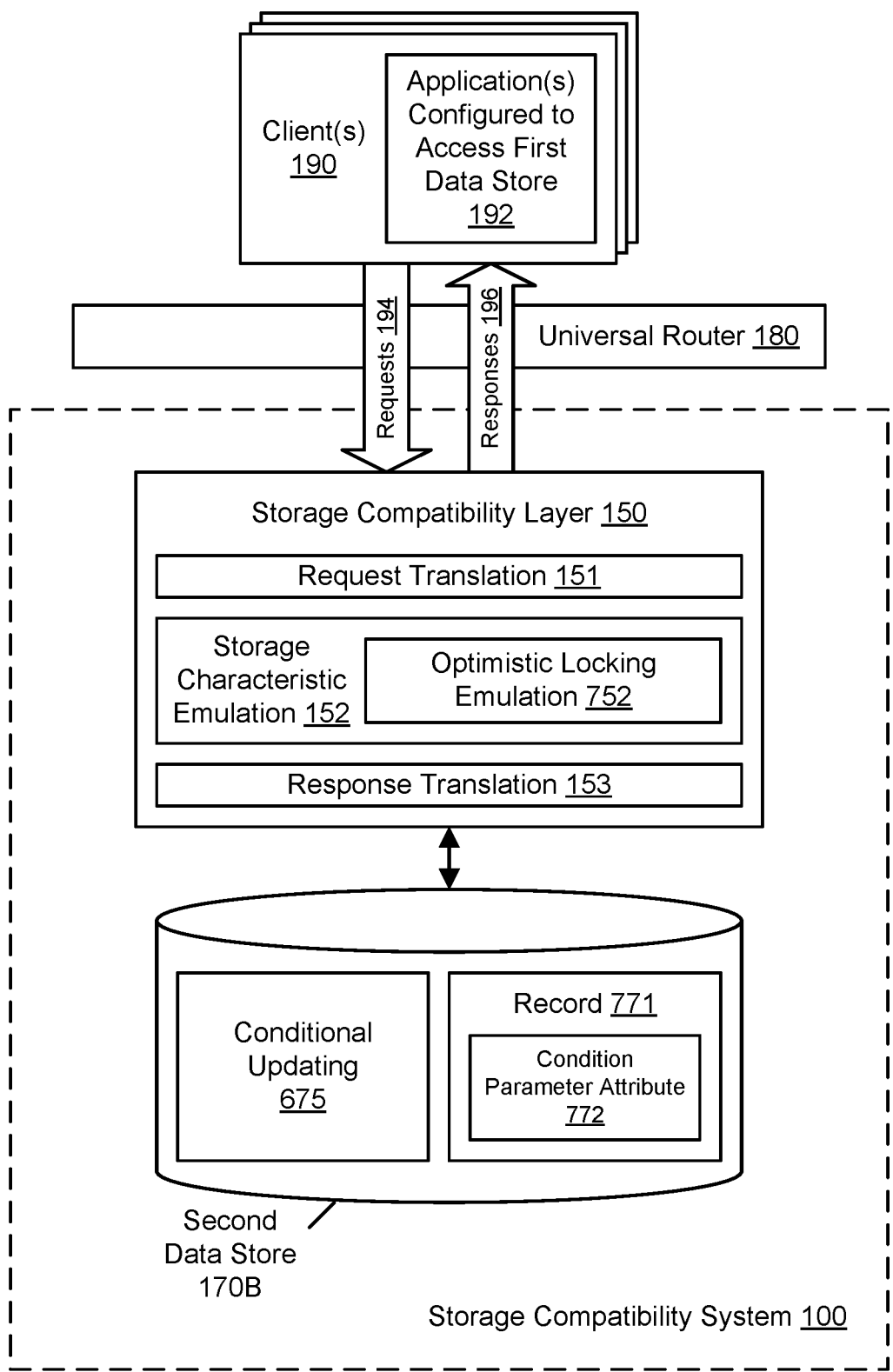
FIG. 7 illustrates further aspects of the example system environment for augmenting storage functionality using emulation of storage characteristics, including emulation of an optimistic locking characteristic, according to some embodiments.

FIG. 7 illustrates further aspects of the example system environment for augmenting storage functionality using emulation of storage characteristics, including emulation of an optimistic locking characteristic, according to some embodiments. As discussed above, the data stores 170A-170B may offer different features, functionality, or other storage characteristics that are associated with differing degrees or guarantees of latency, throughput, security, consistency, reliability, and so on. For example, the first data store 170A may natively offer an optimistic locking feature for individual records, while the second data store 170B may not, or the second data store 170B may natively offer a different implementation of optimistic locking. The component for storage characteristic emulation 152 may include a component for optimistic locking emulation 752 that implements emulation of the optimistic locking characteristic of the first data store 170A. Using the optimistic locking emulation 652, a record 771 may be stored in the second data store 170B with additional data that can be used for emulation of the optimistic locking feature. As shown in FIG. 7, the record may be stored with a condition parameter attribute 772 indicating, for example, that the record is in use. The conditional updating component 675 of the second data store 170B may be used by the optimistic locking emulation 752 to perform or deny a request to update or overwrite the record 771 based (at least in part) on the condition parameter attribute 772. For example, if the client requests to write to the record 771, but the attribute 772 indicates that the record is in use, then the write request may be rejected. However, if the client requests to write to the record 771, but the attribute 772 is absent or indicates that the record is not in use, then the write request may be performed.

As discussed above, the first data store 170A may offer a quorum consistency model among multiple replicas, while the second data store 170B may offer strong consistency using a single master to write to multiple replicas. In some embodiments, operations may be mapped between the protocols associated with the first data store 170A and the second data store 170B such that consistency requirements are observed. A consistent read operation may be mapped from GETKEY (ack:majority) to GetItem (with ConsistentRead:true). An eventually consistent read operation may be mapped from GETKEY (ack:1) to GetItem (with ConsistentRead:false). A read operation with no payload may be mapped from GETKEY (nodata:t) to GetItem (with AttributesToGet). A consistent write operation may be mapped from PUBLISH (operation:PUT, ack:majority) to PutItem, which is always consistent in the second data store 170B. An eventually consistent write operation may be mapped from PUBLISH (operation:PUT, ack:1) to PutItem, which is always consistent in the second data store 170B. A conditional write operation may be mapped from PUBLISH (operation:PUT, condition:IFOLDER) to PutItem (with ConditionalExpression). A consistent delete operation may be mapped from PUBLISH (operation:REMOVE, ack:majority) to DeleteItem, which is always consistent in the second data store 170B. An eventually consistent delete operation may be mapped from PUBLISH (operation:REMOVE, ack:1) to DeleteItem, which is always consistent in the second data store 170B. A conditional delete operation may be mapped from PUBLISH (operation:REMOVE, condition:IFOLDER) to DeleteItem (with ConditionalExpression).

A consistent list operation (for records matching a primary key prefix) may be mapped from GETKEYPREFIX (ack:majority) to Query (with ConsistentRead:true). An eventually consistent list operation (for records matching a primary key prefix) may be mapped from GETKEYPREFIX (ack:1) to Query (with ConsistentRead:false). A consistent list operation (for all records in a table) may be mapped from QUERY (ack:majority) to Scan (with ConsistentRead:true). An eventually consistent list operation (for all records in a table) may be mapped from QUERY (ack:1) to Scan (with ConsistentRead:false). An eventually consistent list operation (for all records in a table) may be mapped from QUERY (ack:1) to Scan (with ConsistentRead:false). A list operation with multiple cursors may be mapped from QUERY (segment:N:M) to Scan (with Segment and TotalSegments).

In some embodiments, elements of request headers may be mapped between the protocols associated with the first data store 170A and the second data store 170B as follows. The header element "ack" may be mapped to "ConsistentRead:true." The header element "condition" or "conditionparam" may be mapped to "ConditionExpression." The header element "count" may be mapped to "Limit." The header element "ec" (entity count) may be mapped to "ItemCollectionMetrics." The header element "es" (entity size) may be mapped to "ItemCollectionMetrics." The header element "expires" may be mapped to "Time to Live." The header element "filter" may be mapped to "FilterExpression." The header element "isTruncated:t" may be mapped to "LastEvaluatedKey." The header element "key" may be mapped to "primary key." The header element "keyprefix" may be mapped to "FilterExpression" with "begins_with." The header element "keystart" may be mapped to "ExclusiveStartKey." The header element "marker" may be mapped to "ExclusiveStartKey." The header element "nodata:t" may be mapped to "ProjectionExpression." The header element "segment" may be mapped to "Segment" plus "TotalSegments." The header element "scope" may be mapped to "TableName."

In some embodiments, various publishing modes supported by the first data store 170A be mapped to the second data store 170B as follows. The mode NONE (to reject the PUBLISH request if the time on the record in the message is less than the time on the record in storage) may be mapped to the ConditionalExpression "NOT attribute_exists(time) OR $time<time." The mode IFRECORDEXISTS (to reject the PUBLISH request if the record does not exist) may be mapped to the ConditionalExpression "partition_key==:partition_key AND sort_key==:sort key." The mode IFNORECORD (to reject the PUBLISH request if the record does exist) may be mapped to the ConditionalExpression "NOT (partition_key==:partition_key AND sort_key==:sort key)." The mode IFENTITYEXISTS (to reject the PUBLISH request if there is not a single record in the same entity in the same scope) may be mapped to the ConditionalExpression "attribute_exists(partition_key)." The mode IFNOENTITY (to reject the PUBLISH request if there is a single record in the same entity in the same scope) may be mapped to the ConditionalExpression "NOT attribute_exists(partition_key)." The mode IFOLDER (to reject the PUBLISH request if the record already exists and if the time of the existing record is greater than the timestamp specified in the conditionparam header) may be mapped to the ConditionalExpression "NOT attribute_exists(time) OR $time<conditionparam." The mode IFURIDMATCHES (to reject the PUBLISH request if the record does not already exist or its ID does not exist in the list of IDs specified by the conditionparam header) may be mapped to the ConditionalExpression "urid IN (:urid:set)."

Illustrative Computer System

In at least some embodiments, a computer system that implements a portion or all of one or more of the technologies described herein may include a computer system that includes or is configured to access one or more computer-readable media. FIG. 8 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 8 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices comprising one or more respective hardware processors and memory configured to:
receive, from a data store associated with storage characteristics, a response to an access request for at least a portion of a data set, the access request performed using emulation of one or more different storage characteristics not included in the storage characteristics, and wherein the response is formatted according to a protocol associated with the data store;

translate the received response into a translated response formatted according to a different protocol associated with a different data store, wherein the different data store is associated with the one or more different storage characteristics, and wherein the translated response reflects the emulation of the one or more different storage characteristics not included in the storage characteristics in performing the access request; and send the translated response in response to the access request.

2. The system of claim 1, wherein the emulation of one or more of the different storage characteristics comprises emulation of optimistic locking, wherein the emulation of optimistic locking comprises storing a condition parameter attribute with a record in the data store.

3. The system of claim 2, wherein a request to overwrite the record is performed or denied using a conditional update feature of the data store based at least in part on the condition parameter attribute.

4. The system of claim 1, wherein the access request comprises an operation name of a requested operation, and one or more attributes of the requested operation, wherein the one or more attributes of the requested operation comprise an attribute that:
   identifies records to be read;
   identifies records to be written to;
   specifies content of requested writes;
   identifies records to be deleted;
   identifies records to be expired; or
   specifies one or more other parameter values that affect an outcome of the requested operation.

5. The system of claim 1, wherein the one or more of the different storage characteristics comprise strong consistency using a single master.

6. The system of claim 1, wherein the emulation of one or more of the different storage characteristics comprises emulation of an expires header associated with the different protocol, wherein the emulation of the expires header comprises writing one or more records to the data store with an attribute representing an expiration time and using a time-to-live feature of the data store, and wherein the one or more records are expired by the data store according to the expiration time.

7. The system of claim 1, wherein the storage characteristics include a conditional update feature that denies a request to overwrite a record having a version header with a record having an earlier version header.

8. The system of claim 1, wherein the storage characteristics comprise strong consistency using a single master.

9. A computer-implemented method, comprising:
   receiving, from a data store associated with storage characteristics, a response to an access request for at least a portion of a data set, the access request performed using emulation of one or more different storage characteristics not included in the storage characteristics, and wherein the response is formatted according to a protocol associated with the data store;
   translating the received response into a translated response formatted according to a different protocol associated with a different data store, wherein the different data store is associated with the one or more different storage characteristics, and wherein the translated response reflects the emulation of the one or more different storage characteristics not included in the storage characteristics in performing the access request; and sending the translated response in response to the access request.

10. The computer-implemented method of claim 9, wherein the emulation of one or more of the different storage characteristics comprises emulation of a tombstone feature associated with the different protocol, wherein the emulation of the tombstone feature comprises:
   maintaining an expired record in the data store for a period of time using a tombstone attribute; and
   determining that the expired record is tombstoned based at least in part on the tombstone attribute during the period of time, wherein the expired record is deleted from the data store after the period of time using a time-to-live feature of the data store.

11. The computer-implemented method of claim 9, wherein the emulation of one or more of the different storage characteristics comprises emulation of a time header associated with the different protocol, wherein the emulation of the time header comprises storing a version header for a record in the data store.

12. The computer-implemented method of claim 11, wherein a request to overwrite the record having the version header with a record having an earlier version header is denied using a conditional update feature of the data store.

13. The computer-implemented method of claim 9, wherein the emulation of one or more of the different storage characteristics comprises emulation of optimistic locking, wherein the emulation of optimistic locking comprises storing a condition parameter attribute with a record in the data store.

14. The computer-implemented method of claim 13, wherein a request to overwrite the record is performed or denied using a conditional update feature of the data store based at least in part on the condition parameter attribute.

15. The computer-implemented method of claim 9, wherein the access request comprises an operation name of a requested operation, and one or more attributes of the requested operation, wherein the one or more attributes of the requested operation comprise an attribute that:
   identifies records to be read;
   identifies records to be written to;
   specifies content of requested writes;
   identifies records to be deleted;
   identifies records to be expired; or
   specifies one or more other parameter values that affect an outcome of the requested operation.

16. The computer-implemented method of claim 9, wherein the one or more of the different storage characteristics comprise strong consistency using a single master.

17. The computer-implemented method of claim 9, wherein the emulation of one or more of the different storage characteristics comprises emulation of an expires header associated with the different protocol, wherein the emulation of the expires header comprises writing one or more records to the data store with an attribute representing an expiration time and using a time-to-live feature of the data store, and wherein the one or more records are expired by the data store according to the expiration time.

18. One or more non-transitory computer-readable storage media storing program instructions that, when executed on or across one or more processors, perform:
   receiving, from a data store associated with storage characteristics, a response to an access request for at least a portion of a data set, the access request performed using emulation of one or more different storage characteristics not included in the storage characteristics, and wherein the response is formatted according to a protocol associated with the data store;

translating the received response into a translated response formatted according to a different protocol associated with a different data store, wherein the different data store is associated with the one or more different storage characteristics, and wherein the translated response reflects the emulation of the one or more different storage characteristics not included in the storage characteristics in performing the access request; and sending the translated response in response to the access request.

19. The one or more non-transitory computer-readable storage media of claim 18, wherein the emulation of one or more of the different storage characteristics comprises emulation of a time header associated with the different protocol, wherein the emulation of the time header comprises storing a version header for a record in the data store.

20. The one or more non-transitory computer-readable storage media of claim 18, wherein the emulation of one or more of the different storage characteristics comprises emulation of optimistic locking, wherein the emulation of optimistic locking comprises storing a condition parameter attribute with a record in the data store.

* * * * *